United States Patent [19]

Franke et al.

[11] 4,140,389

[45] Feb. 20, 1979

[54] TONER REMOVING APPARATUS

[75] Inventors: Walter Franke, Mönich; Peter Lischinski; Ottmar Wolf, both of Grünwald; Fritz Rau, Unterhaching; Günther Schnall, Eching; Wolfgang Ebner; Johann Horvat, both of Münich, all of Fed. Rep. of Germany

[73] Assignee: AGFA-Gevaert AG, Leverkusen, Fed. Rep. of Germany

[21] Appl. No.: 781,026

[22] Filed: Mar. 25, 1977

[30] Foreign Application Priority Data

Mar. 27, 1976 [DE] Fed. Rep. of Germany ....... 2613235

[51] Int. Cl.[2] ...................... G03G 21/00; B21B 45/02; A46B 15/00; B60S 1/28

[52] U.S. Cl. .................................. 355/15; 15/256.52; 118/652

[58] Field of Search .................. 355/3R, 15; 118/652; 15/256.52

[56] References Cited

U.S. PATENT DOCUMENTS

| | | | |
|---|---|---|---|
| 3,655,373 | 4/1972 | Fisher et al. | 118/652 X |
| 3,838,472 | 10/1974 | Oriel | 355/15 X |
| 3,884,572 | 5/1975 | Bacon et al. | 355/15 |
| 3,927,937 | 12/1975 | de Keyzer | 355/15 |
| 3,950,092 | 4/1976 | Zoltner | 355/15 |

*Primary Examiner*—Fred L. Braun
*Attorney, Agent, or Firm*—Michael J. Striker

[57] ABSTRACT

An electrostatic copier of the type wherein an electrostatic image pattern is formed on the photoconductive surface of a travelling endless carrier, to which pattern toner particles are attracted to form a visible image which is then transferred to an image carrier, has a toner removing apparatus for removing residual toner particles from the photoconductive surface. The apparatus has a roller adjacent the surface and a doctor blade above the roller which strips toner particles from the surface so that they fall onto the roller. During rotation of the roller these particles are stripped off the roller and enter through a slot into a tube in which a polygonal cross-section member rotates which entrains the particles and conveys them to another slot of the tube to eject them from this other slot into a storage chamber.

11 Claims, 1 Drawing Figure

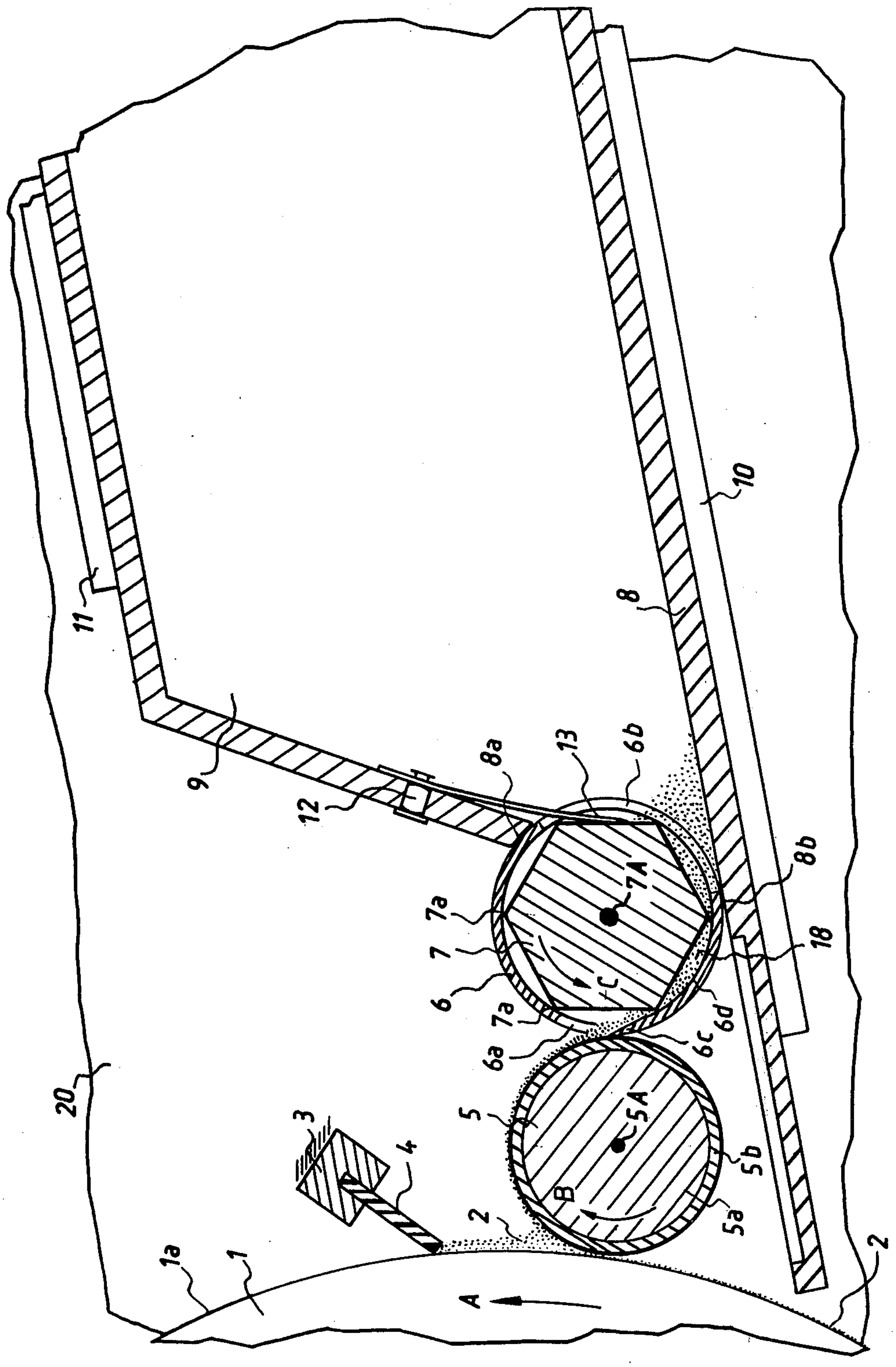
1
1a
2
2
2
3
4
5
5A
5a
5b
6
6a
6b
6c
6d
7
7A
7a
7a
8
8a
8b
9
10
11
12
13
18
20
A
B
C

TONER REMOVING APPARATUS

BACKGROUND OF THE INVENTION

This invention relates to electrostatic copiers, and in particular to toner removing apparatus used in such copiers.

Since electrostatic copiers are known per se, their construction and operation require no detailed description. For purposes of the present invention it is sufficient to point out that in such copiers an image is formed on the electrostatically charged photoconductive surface of a carrier, by applying toner particles to the electrostatic image pattern to which they adhere. The image is then transferred to an image carrier, e.g. a copy sheet. However, after the transfer some residual toner particles will continue to adhere to the photoconductive surface and these must be removed before the next image pattern is formed on the surface. If they are allowed to remain their presence will result in smeared or otherwise unsatisfactory images during the succeeding operations of the copier.

Various proposals have been made for apparatus to remove these residual toner particles. One of these proposals, disclosed in German Offenlegungsschrift No. 2,239,441, suggests the use of a rotating member to entrain particles which have been stripped from the photoconductive surface, and to transport these particles into a storage space. Between the wall of the chamber and the rotating member there is a gap through which the toner particles can escape. Also, due to the presence of this gap the chamber is not sealed relative to the area in which particles are stripped from the photoconductive surface, so that particles can migrate from the chamber back into this area. Since the toner particles are in effect shovelled into the chamber and no toner compacting takes place therein, they are only loosely received therein so that the chamber is rapidly filled.

SUMMARY OF THE INVENTION

It is an object of the invention to provide an improved toner removing apparatus of an electrostatic copier.

A more particular object is to provide such an apparatus in which the residual toner is quickly and thoroughly removed from the photoconductive surface of the travelling carrier, and is thereupon transported substantially in its entirety into a storage or collecting chamber.

Another object is to provide an apparatus of the type in question which packs the toner particles into the storage chamber, so as to make the best possible use of the chamber volume.

Still a further object is to provide such an apparatus wherein the area of toner removal (from the photoconductive carrier surface) is reliably sealed with reference to the interior of the chamber, so that migration of toner particles from the chamber back to this area is avoided.

In keeping with these objects and with others which will become apparent hereafter, one feature of the invention resides in a toner removing apparatus in an electrostatic copier. Briefly stated, the apparatus includes, in an electrostatic copier wherein an electrostatic image pattern is formed on the photoconductive surface of a travelling endless carrier, toner particles are electrostatically attracted to the pattern to form a visible image and thereupon transferred to an image carrier, and cleaning means subsequently cleans incremental portions of the photoconductive surface to remove residual toner particles therefrom which then become lodged on the cleaning means, a combination comprising means for dislodging toner particles from the cleaning means, a receptacle having an inlet spaced from the dislodging means, and means for entraining the dislodged toner particles and for impelling them into said inlet of the receptacle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a fragmentary vertical section illustrating an exemplary embodiment of the invention.

DESCRIPTION OF A PREFERRED EMBODIMENT

The FIGURE shows only those components of an electrostatic copier which are essential for an understanding of the invention.

The endless carrier is illustrated as a drum 1 which is driven (in a manner known per se and not shown) to rotate in direction of the arrow A. Drum 1 has a photoconductive surface layer 1*a*. The operating stations are not shown, but it will be understood that at one station the surface 1*a* is electrostatically charged to produce an (invisible) image pattern. At a circumferentially spaced station toner particles are applied to the image pattern to form a visible image. During further rotation of the drum 1 the image is then transferred to an image carrier (e.g. a sheet of paper) to "make a copy". Transfer of the toner particles making up the image is not entirely complete; certain residual toner particles continue as a rule to adhere to the surface 1*a*. These residual toner particles 2 are to be removed by the apparatus according to the invention.

This apparatus includes a doctor blade 4 (here of synthetic plastic material, e.g. acrylic, PVC or the like) which is secured on or in a support 3; the latter is in turn mounted on the machine housing 20 or the machine frame, as diagrammatically illustrated. An edge of the blade 4 engages the photoconductive surface 1*a* and, during rotation of the drum 1 in direction A, strips toner particles 2 off this surface.

Downwardly spaced from doctor blade 4 is a transporting roller 5 which is mounted in the housing or frame for rotation about its axis 5A, as indicated by arrow B. Roller 5 is driven by a not-illustrated drive which is known per se. The roller has an electrically conductive (e.g. metallic) core 5*a* which is surrounded by a tubular jacket 5*b* of rubber or synthetic plastic material. The core 5*a* is electrically connected to an electric potential of about 2KV (details of this are explained in the copending application Ser. No. 750,804, filed Dec. 15, 1976 now U.S. Pat. No. 4,101,215, of G. Fottner et al) so that an electrostatic field is established about the roller 5 which already electrostatically picks some of the toner particles off the surface 1*a* as the particles approach the very narrow gap defined between the surface 1*a* and the roller 5. Furthermore, those toner particles which do travel through and beyond this gap to be stripped off by the doctor blade 4, drop onto the roller 5 to which they adhere due to the electrostatic attraction of the field.

At the other side of roller 5, remote from drum 1 and from the roller, is a cassette or similar receptacle 8 having a toner storage and collecting chamber 9. Cassette 8 is guided by rails 10, 11 which are mounted in the housing 20; when it is full it can be withdrawn from the housing (to the right) along these rails, to be emptied or replaced with a spare. The cassette 8 has an inlet which is bounded by the edge face 8*a* and a surface portion 8*b*; this inlet is elongated along the axis of rotation 5A.

Interposed between the roller 5 and the inlet of the cassette 8 is an arrangement for entraining the residual toner particles and for impelling them into the inlet of the cassette.

In the illustrated embodiment this arrangement comprises a tube 6 which is mounted on the machine frame or the housing 20 and which has two circumferentially spaced slots 6*a* and 6*b* which extend parallel to the axis of the tube 6. The lower edge portion of the slot 6*a* is configurated as an outwardly curved lip which engages the surface of roller 5 and acts as a doctor blade to scrape or dislodge the toner particles 2 from the roller surface. These particles enter the tube 6 through the slot 6*a*.

An elongated member 7 of polygonal (hexagonal is illustrated) cross-section is mounted in known manner in the tube 6, to rotate about an axis 7A which in the illustrated embodiment coincides with the axis of tube 6. Member 7 rotates in direction of the arrow C and is driven by a not-illustrated drive which is known per se.

The member 7 has a plurality of circumferentially spaced axially extending edges 7*a* which extend to the inner circumferential surface 6*d* of the tube 6. Each circumferentially adjacent pair of these edges forms with the surface 6*d* a closed compartment 18 for transportation of toner particles 2. Whenever one of these compartments 18 passes the slot 6*a* it is charged with the particles which are stripped off the roller 5 by the lip 6*c* and it then transports these particles to the slot 6*b* through which they are expelled into the chamber 9 through the inlet of cassette 8. The edge face 8*a* and the surface portion 8*b* of cassette 8 sealingly engage the tube 6 at opposite circumferential sides of slot 6*b*.

A resiliently flexing wiper element 13 (e.g. of spring steel) is secured to the cassette 8 by means of rivets 12 (one shown) or other fasteners; it seals the chamber 9 with respect to the exterior against migration of particles back through the tube 6, since its free end portion resiliently engages the periphery of member 7 and wipes any remaining toner particles off the same.

It is important to note that the arrangement including the elements 6, 7, and 13 in effect operates in the manner of a pump. In other words: instead of merely shovelling the residual toner particles into the chamber 9 it "pumps" or forces them into the chamber. This means that the particles are "packed" into the chamber, i.e., even if the chamber is already filled with particles which are, however, only loosely filling it, a substantial additional volume of particles can be pressed into the chamber 9 since each charge delivered from a respective compartment 18 causes compression of the contents of chamber 9. Due to this compression (compaction) of the contents the cassette can accommodate a very large quantity of toner particles in densely compacted state, before it is so full that it must be removed to be emptied or replaced with an empty spare. The removal of the cassette 8 now need be effected only at relatively long intervals, which is desirable because it reduces maintenance chores.

The disclosed invention is susceptible of various modifications. For example, member 6 need not be a tube but could be an arcuately curved element. Member 7 need not be hexagonal, but could have an otherwise polygonal cross-section. What counts is that each pair of circumferentially adjacent longitudinal edges (corresponding to edges 7*a*) of the cross-sectional profile must form a compartment with the surface of tube (or other member) 6 which faces the member 7 (or its equivalent).

The slots 6*a*, 6*b* extend over substantially the entire length of the tube 6 (not illustrated), but they need not be that long. The axis of rotation of member 7 need not coincide with the axis of the tube 6. The tube 6 extends advantageously substantially parallel to the axes of drum 1 and roller 5.

While the invention has been illustrated and described as embodied in an electrostatic copier, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an electrostatic copier wherein an electrostatic image pattern is formed on the photoconductive surface of an endless traveling carrier, toner particles are electrostatically attracted to said pattern to form a visible image and are thereupon transferred to an image carrier, and cleaning means subsequently cleans incremental portions of the photoconductive surface to remove residual toner particles therefrom which then become lodged on the cleaning means, a combination comprising means for dislodging toner particles from said cleaning means; a receptacle having an inlet spaced from said dislodging means; and means for entraining the dislodged toner particles and for impelling them into said inlet of said receptacle, including a tubular housing having a slot-shaped inlet opening facing toward said cleaning means and a slot-shaped outlet opening circumferentially spaced from said inlet opening and communicating with said inlet of said receptacle, and an entraining member movable in said housing for entraining and conveying toner particles through said housing from said inlet opening to and outwardly through said outlet opening.

2. A combination as defined in claim 1, wherein said cleaning means comprises a doctor blade in contact with said surface for stripping toner particles off the same, and a roller adjacent said surface and below said doctor blade so that stripped-off toner particles drop onto said roller.

3. A combination as defined in claim 1, wherein said cleaning means comprises a roller adjacent said surface for receiving toner particles and transporting them away from said surface, said dislodging means comprising means for stripping toner particles from said roller.

4. A combination as defined in claim 3, said tubular housing extending substantially parallel to an axis of rotation of said roller intermediate the latter and said receptacle, said inlet opening being bounded by two longitudinally extending lips one of which is curved toward and engages a circumferential surface of said roller and constitutes said stripping means.

5. A combination as defined in claim 4, wherein said tubular housing has an inner circumferential surface, said entraining member being of polygonal cross-section mounted for rotation about the longitudinal axis of said tubular housing and having a plurality of axially extending circumferentially spaced edges which engage said inner circumferential surface, each pair of circumferentially adjacent ones of said edges defining with one another and with said inner circumferential surface a compartment for toner particles to be entrained.

6. A combination as defined in claim 5, wherein said one lip is curved towards said roller from an axially extending portion of said tubular housing which is spaced from the other of said lips by a circumferential distance at least equal to the circumferential spacing between adjacent ones of said edges.

7. A combination as defined in claim 5, wherein said carrier is a rotary drum, and said tubular housing extends substantially parallel to the axis of rotation of said drum.

8. A combination as defined in claim 5, wherein said entraining member is of prismatic cross-section.

9. A combination as defined in claim 5, wherein said entraining member is of hexagonal cross-section.

10. A combination as defined in claim 1, said cleaning means comprising a roller adjacent said surface for receiving toner particles and transporting them away from said surface; and wherein said housing comprises a curved wall extending from said inlet to said roller and having a lip extending along and in contact with said roller to strip toner particles off the same, the entraining member being of polygonal cross-section rotatable about an axis substantially parallel to the axis of rotation of said roller and having a plurality of longitudinally extending circumferentially spaced edges which travel in a circular path and along said wall so as to entrain toner particles stripped off said roller and convey them along said wall to said inlet.

11. A combination as defined in claim 10; further comprising a flexible member mounted at said inlet and engaging a circumferential surface of said entraining member for stripping toner particles from the same.

* * * * *